July 1, 1947.  L. J. WESTHAVER ET AL  2,423,216
METHOD OF HEATING OPEN HEARTH FURNACES
Filed May 21, 1943  2 Sheets-Sheet 1
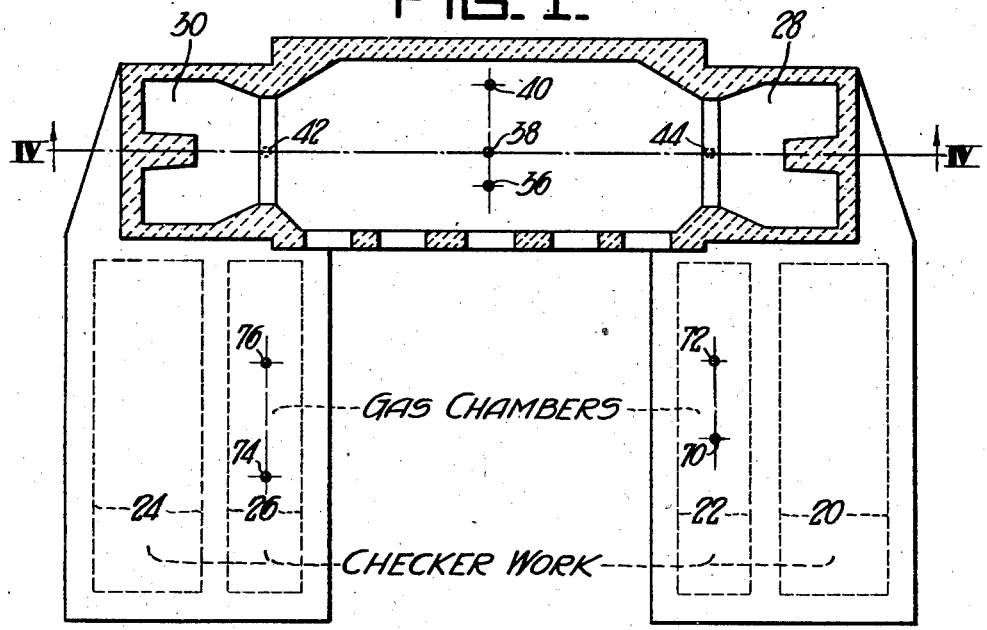
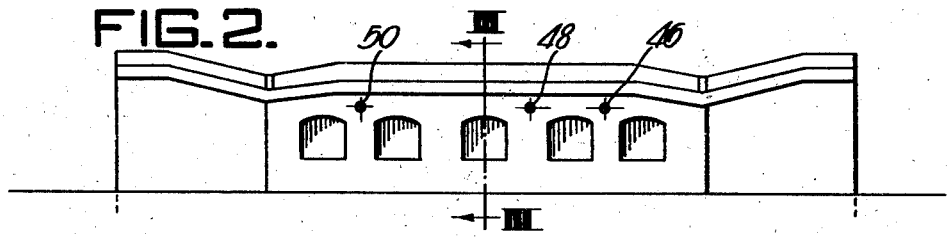
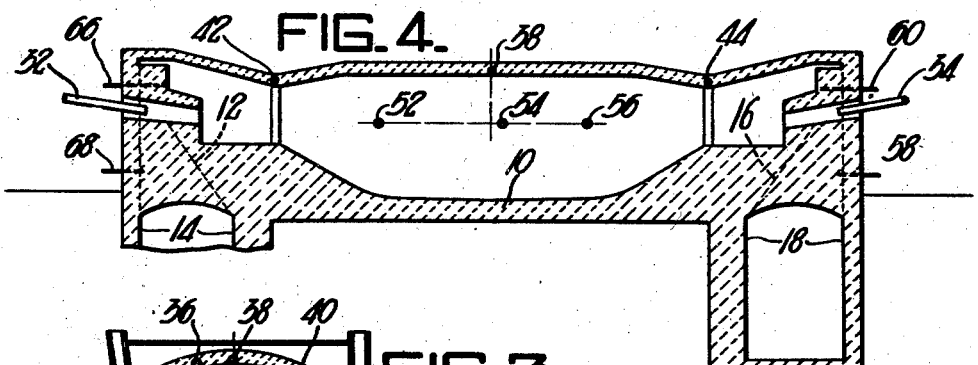
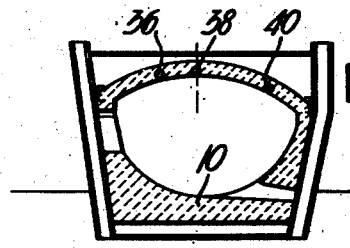
INVENTORS:
LOREN J. WESTHAVER and
JOHN A. SLENKER
BY John E. Jackson
THEIR ATTORNEY.

July 1, 1947.　　L. J. WESTHAVER ET AL　　2,423,216
METHOD OF HEATING OPEN HEARTH FURNACES
Filed May 21, 1943　　2 Sheets-Sheet 2
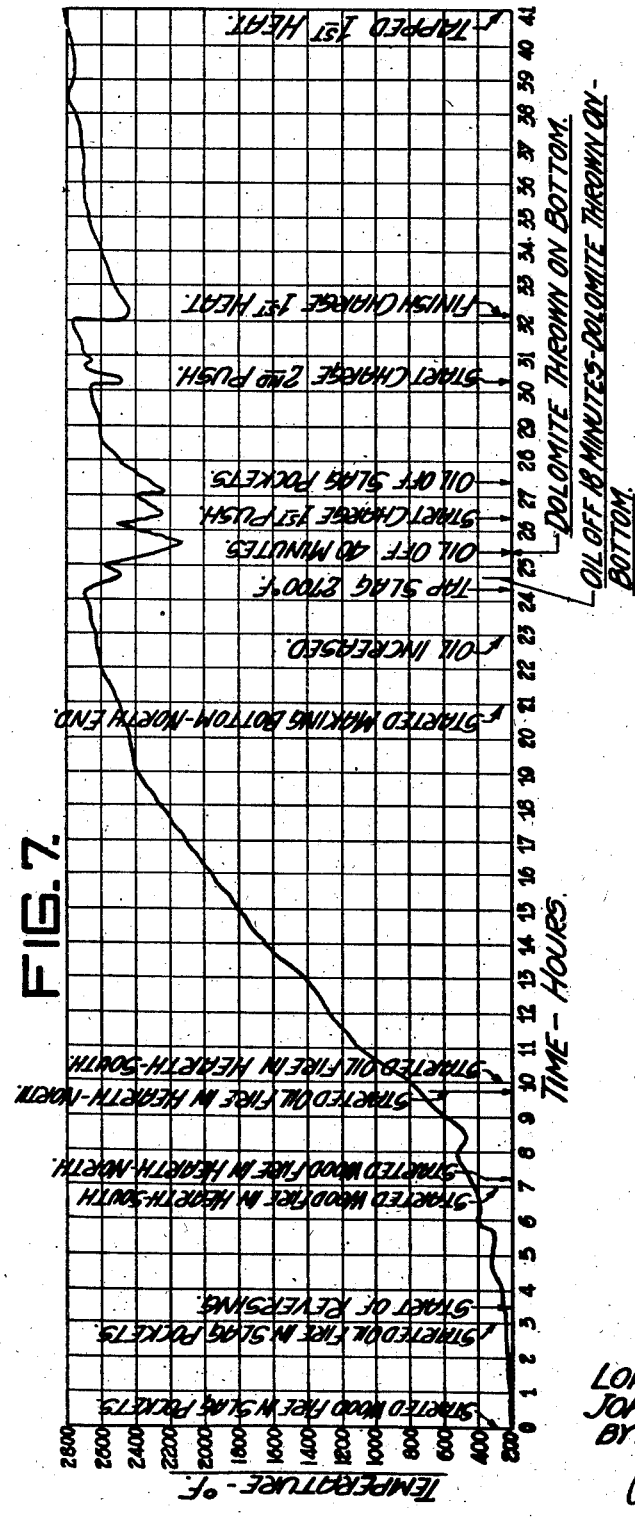
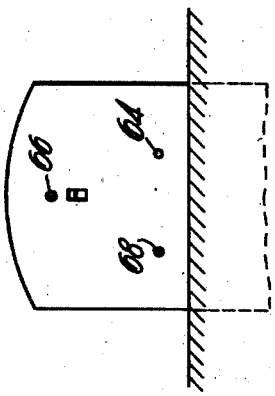
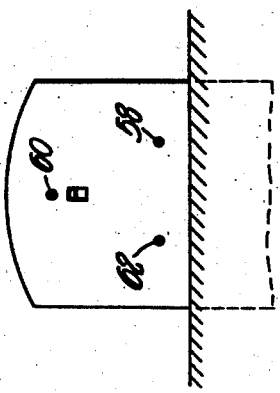
INVENTORS:
LOREN J. WESTHAVER and
JOHN A. SLENKER,
BY: John E. Jackson
THEIR ATTORNEY.

Patented July 1, 1947

2,423,216

UNITED STATES PATENT OFFICE 2,423,216

METHOD OF HEATING OPEN-HEARTH FURNACES

Loren J. Westhaver, Monongahela, Pa., and John A. Slenker, Worcester, Mass., assignors to The American Steel and Wire Company of New Jersey, a corporation of New Jersey Application May 21, 1943, Serial No. 487,938

9 Claims. (Cl. 263—52)

The present invention relates to furnace operations, and more particularly to improvements in the method of rapidly yet safely heating up the brickwork of a furnace from a cold start to a practical, intensely hot operating temperature. While not limited thereto, the invention is chiefly concerned with the initial heating of an open hearth furnace from a cold state to the intense temperature required in the melting and refining of steel.

It is well known to those familiar with operating practices in the steel industry, that the open hearth furnaces used in a modern steel plant are being continually eroded and burned away in different parts. This necessitates the adoption of such an operating schedule that at various times different furnaces in a large plant can be periodically either partly or wholly dismantled and torn down for the replacement of spent parts. This gradual destruction of plant and equipment is an inherent condition with which steel producers have been confronted for years.

Because of the shut-downs for rebuilding or repairs, it becomes necessary in a modern steel plant to frequently start up a cold furnace so as to bring it to proper operating temperature for the normal steel making process. If the heating is done too rapidly, the brickwork spalls or is otherwise injured, or if heated too slowly, production schedules suffer. Although this problem has been before those skilled in the art for many years, it is nevertheless a fact that prior to our invention there had never been developed a uniform practice for the rapid yet safe and efficient heating up of a cold furnace. The customary practice which has been followed for many years by those skilled in the art, is to heat up the brickwork at a relatively slow rate for a day or more, so as to avoid the damage which is known to occur by the spalling of the brickwork when heating takes place too rapidly. The length of time required to bring a furnace up to practical operating conditions is variable, depending somewhat upon the types of refractories used.

Heretofore, the time required to heat up cold open hearth furnaces has been left largely to the judgment of the melters and their first helpers. These operators, being charged with the responsibility of keeping the furnace in the best operating condition for a given campaign, heat up the furnace slowly and cautiously, because of the fear that if it is heated too quickly, the brickwork will be damaged by spalling. This results in the initial heating period consuming an inordinate length of time, which brings about a material loss, since the furnace is non-productive during this initial preheating operation, and many such preheatings normally occur during the life of most present-day open hearth furnaces.

The present invention aims to overcome the somewhat haphazard practice which has been in vogue for many years, and to provide a rational method whereby a uniform practice can be followed so as to initially heat up the furnace from a cold start at an optimum high rate of speed yet without deleteriously affecting the brickwork of the furnace structure.

The invention will be readily understood from consideration of the following detailed disclosure and the appended claims, when read in connection with the accompanying drawings which, by way of illustration but not limitation, refer to the initial heating up of a conventional form of open hearth steel making or metallurgical furnace.

In the drawings:

Figure 1 is a horizontal section through a portion of a conventional open hearth furnace and the regenerators associated therewith, showing several locations in which thermocouples are adapted to be installed in the practice of the method herein disclosed and claimed.

Figure 2 is an elevation as viewed from the charging side of the furnace of Figure 1.

Figure 3 is a section on line III—III of Figure 2.

Figure 4 is a section on line IV—IV of Figure 1.

Figures 5 and 6 are elevations from the right and left ends respectively of Figure 1.

Figure 7 is a time-temperature graph illustrating the time-temperature gradient, or otherwise expressed, the temperature rise per unit of time of the brickwork during different stages in heating up the furnace from a cold start when new or after rebuilding, to the practical steel making temperature attained at the time that the first heat of steel made therein is tapped.

Referring more particularly to the drawings, the open hearth furnace illustrated in Figures 1 through 6, generally speaking, is of a conventional type well known to those skilled in the art, and includes the usual hearth 10, air uptake 12 and slag pocket 14 at the ingoing end of the furnace, and a downtake 16 and slag pocket 18 at the outgoing end. The furnace as shown is equipped at the ingoing end with an air regenerator 20 and gas regenerator 22, and at the outgoing end with a similar air regenerator 24 and gas regenerator 26. These regenerators are connected with the usual gas and air ports leading to the combustion chambers 28 and 30 at the respective ends of the furnaces, and suitable flues and conventional reversing valves (not shown) connect the regenerators with the stack (not shown). At regular intervals the gas flow through the furnace will be reversed during normal steel making operations, in a manner well known to those skilled in the art.

The fuel may be supplied to the furnace in any conventional manner. By way of illustration, we have shown tar or other liquid fuel burners 32 and 34 at the opposite ends of the furnace. It will be understood by those skilled in the art that when producer gas is used to fire the furnace, the burners 32 and 34 will be omitted, and likewise, when the tar or other liquid fuel burners are used, the gas regenerators 22 and 26 will be omitted. Insofar as the method herein claimed is concerned, the type of fuel used and the manner of its application during the normal steel making process is immaterial, since the invention relates more particularly to an improved method and procedure whereby a new or rebuilt furnace can be very rapidly yet safely heated up to steel making temperature without causing the brickwork structure to spall or be otherwise deleteriously affected. As will be pointed out in greater detail hereinafter, the invention is chiefly concerned with a method of initially heating up the brickwork structure of a furnace so as to prevent damage thereto by spalling, which comprises (a) determining the maximum rate of temperature rise per unit of time (herein sometimes referred to as the time-temperature gradient) which the furnace brick will withstand without spalling when heated from normal seasonal atmospheric temperature to the critical temperature of said brick; (b) determining the maximum rate of temperature rise per unit of time which said brick will withstand without spalling after it has reached the critical temperature; then (c) finally heating up the furnace at a relatively slow rate not greater than that of the first-mentioned determination, and (d) thereafter greatly increasing the heating rate but not exceeding that of the said maximum second-mentioned determination. The various time-temperature gradients or rates of temperature rise per unit of time hereinafter referred to, are readily determinable by installing known types of thermocouples at various vulnerable parts of the furnace structure, connecting the same with known types of pyrometers, including inking or printing mechanism which record instantaneous temperatures on a chart driven by a clock, whereby the temperature rise per unit of time can be readily ascertained in a manner well known to those skilled in the art.

As shown in Figures 1 through 6, thermocouples indicated by numerals 36, 38 and 40 are located approximately in alignment along the center line of the roof of the furnace. Other roof thermocouples 42 and 44 are located near the port ends of the furnace. Similarly, thermocouples 46, 48 and 50 are located in the front wall of the furnace. In like manner, thermocouples 52, 54 and 56 will be located in the back wall at approximately the elevation shown in Figure 4. In the one end wall, as shown in Figure 5, thermocouples will be installed at the locations indicated at 58, 60, and 62. At the opposite end wall, as indicated at 64, 66 and 68 in Figure 6, similar thermocouples will be installed. As indicated at 70 and 72, thermocoupdes are installed in the gas regenerator at one end of the furnace. Likewise, similar thermocouples 74 and 76 are installed in the gas regenerators at the opposite end of the furnace. Each respective thermocouple will be connected with a suitable pyrometer, preferably of the clock-driven recording type, and in this way it is apparent that a furnace operator can be accurately informed of the rise in temperature per unit of time in many different parts of the furnace brickwork.

While in our studies and investigations leading up to the completion of the present invention, we have investigated the rate of heating in all regions of the furnace where the above described thermocouples are installed, we have concluded that for most practical purposes it is only necessary to install one or more thermocouples in the central region of the roof of the furnace, or in some cases in the central region of the roof and in the vicinity of the gas regenerators. Rare metal Pt-Rb thermocouples were used in those locations where temperatures as high as 3000° F. are encountered, and at all other locations Chromel-Alumel thermocouples were used, as these are to be regarded as reliable only up to temperatures of 2100° F. The rare metal thermocouples used are preferably connected to a standard 4-point Leeds and Northrup recording pyrometer such as that known as recorder No. 184 or its equivalent. The remaining thermocouples are desirably connected with a 16-point Leeds and Northrup recording pyrometer known as No. 165 or its equivalent. Preferably the thermocouples are embedded in the brickwork by drilling a hole in the brick so that the bimetallic or active elements of the respective thermocouples occupy positions approximately one inch from the inner face of the furnace brickwork which is directly exposed to the action of the heating gases. Actually in our investigations leading up to the completion of the invention, many thermocouples were installed in such a way that their active portions terminated respectively one inch, four inches, seven inches, and ten inches from the inner surface of the brickwork, and from readings taken from the many thermocouples, time-temperature gradients for the type of brickwork under consideration were charted graphically. It is not considered necessary to show this time-temperature gradient for all depths of thermocouple penetration into the brick, since our improved method may be fully understood by consideration of a detailed disclosure in connection with temperature readings taken from a single thermocouple installed in the most vulnerable part of the furnace; for example, such as the center of the roof, with the active element of the thermocouple terminating one inch from the inner surface thereof. Take, for example, a thermocouple installed in the location indicated at 38 in Figures 1 and 2, with its active bimetallic elements extending to a point within one inch from the inside surface of the furnace chamber.

By observation of pyrometer readings, we have determined that the rates of temperature rise and temperature fluctuations are practically the same over the entire roof, and we have determined that variations between five locations did not exceed 100° F. It is evident that chilling effects due to making bottom and charging influence the brick temperature to a depth of only approximately 5 inches. We have observed evidence of a minor influence which lags at greater depths, but such temperature changes are considered negligible.

In the light of our investigations and determinations, it is believed that brick temperatures are substantially or approximately the same at the same levels over the entire roof area, and that the region nearest the inner face of the furnace chamber is influenced the greatest by furnace practice. It is therefore evident that a thermocouple installed at one point, preferably at the center of the roof, and inserted to a depth of one inch from the inner surface, will provide means for satisfactorily controlling the roof temperature. Such a single roof thermocouple supplemented with thermocouples in the checker chambers will provide for an excellent control of the heating up of a new furnace structure or of a structure which is being rebuilt. The rate of temperature rise should not exceed the limits herein referred to, and the operator should bring the furnace temperature up according to a definite schedule, with suitable recordings and charts as a guide; for example, by use of a time-temperature chart such as herein shown in Figure 7, or other definite guiding data.

The graph in Figure 7 shows the time-temperature rate of a single thermocouple, and depicts the heat record from the time the brickwork of an open hearth steel making furnace was initially installed or rebuilt, to the time the first heat of metal was tapped therefrom. In this graph the ordinates numbered from 1 to 41 represent time intervals of one hour each, and the abscissae numbered from 200 to 2800 represent temperatures in degrees Fahrenheit.

It is regarded as important in carrying out the method of the present invention, to ascertain the critical temperature of the particular type of brick of which the furnace is built. In the specific illustration of the invention herein disclosed in connection with the initial heating up of an open hearth steel making furnace, the brick used as criteria is a commercial form of silica brick extensively used in the construction of the roof and other parts of conventional open hearth furnaces, such brick being made and sold by various producers of steel plant supplies. This silica brick is composed of approximately .44 $Fe_2O_3$, 96.3 $SiO_2$, and 1.01 $Al_2O_3$. We have determined that the cristobalite reversion point of such silica roof brick is reached when the brick attains a temperature of approximately 480° F. It is an important feature of our invention to accurately control the rate of temperature rise per unit of time until the critical point is reached, after which the brickwork can be safely heated at a very much higher rate per unit of time. As applied to silica brick, we have determined that until the critical temperature has been reached, the same should not be heated up at a rate greater than 90° F. per hour. However, after such silica brick attains the critical temperature of 480° F. (corresponding to the cristobalite reversion point) we have determined that the heating rate can be greatly increased to as high as 230° F. per hour, without spalling the brick and without otherwise deleteriously affecting the brickwork of the furnace structure.

Figure 7 graphically shows the rate of heating the silica roof brick of an open hearth steel furnace. The graph illustrated was plotted from pyrometer readings taken from the thermocouple indicated at 38, in the central region of the roof of the furnace. In our practical reduction to practice of the invention charted in Figure 7, heat was first applied to the furnace structure by starting a wood fire in the slag pocket, as indicated by the legend at the left in Figure 7. Oil firing was started in the slag pockets three hours after the completion of the furnace brickwork. A half hour later, reversals of the fuel flow were started, as noted by the legend in Figure 7 at time 3:30.

The following tabulation, taken from the graph, Figure 7, shows the rate of temperature rise of the roof brick during the heating-up period to the 24th hour of heating, when the slag was tapped.

| Time, Hours | Temp., Deg. F. | Rate of Temp. rise, Deg. per Hr. | Time Wood Fire | Rate of Oil Consumption Gallons per hour | | |
|---|---|---|---|---|---|---|
| | | | | Slag Pockets | Furnace Burners | Total |
| 0-5 | 300 | 40 | 3 | [1] 50 | | 50 |
| 5-10 | 750 | 90 | | 80 | | 80 |
| 10-15 | 1,800 | 230 | | 70 | 70 | 140 |
| 15-20 | 2,400 | 120 | | 70 | 140 | 210 |
| 20-24 | 2,670 | 70 | | 70 | 160 | 230 |

[1] Two hours.

It will be noted that the rate of temperature rise through the range 480°-600° F., within which range cristobalite reversion takes place, and therefore the range of maximum expansion for silica brick, was 90° per hour or under, throughout the brick. It will also be noted that just beyond 600° F. the rate of temperature rise was increased rapidly.

Seven hours after the furnace was completed, a wood fire was started in the south end of the hearth, and a quarter of an hour later a wood fire was started in the north end of the hearth. This increased the temperature of the roof brick to about the critical temperature of 480° F., and the rate of 90° F. per hour was at no time exceeded in the initial stage. As shown in the graph, about 9¾ hours after the completion of the furnace, oil firing was started at the north end of the furnace, thus raising the temperature of the brickwork to approximately 700° F. After the tenth hour, oil firing was initiated at the south end of the furnace hearth. From the graph it will be noted that after 9¾ hours have elapsed from the starting point of the heating-up operation, the temperature of the brickwork was very rapidly accelerated, but at no time did the rate of heating exceed 230° F. per hour. After the brickwork had been heated for 21 hours, a conventional bottom-making furnace operation was started. At the 23-hour stage, the amount of fuel oil supplied was increased. Thus the temperature increased until a maximum temperature of about 2700° F. was attained at about the 24¼-hour stage. At this point the first slag was tapped, and the temperature thereof was found to be 2700° F. The furnace was, in fact, adequately heated up at the 24-hour stage, and was in condition for ordinary steel making operations. The legends on the drawing from the 23-hour period on, indicate somewhat conventional furnace practice, and the temperature fluctuations due to the introduction of charges and the like can be ignored insofar as the present invention is concerned. However, the information indicated by the legends on the chart shows the furnace performance from the time the furnace structure was completed until the first heat of steel was tapped therefrom 41 hours later.

From the described practice it has been established that heating through the cristobalite reversion point (480° F.) of silica roof brick at the rate of 90° F. per hour, will produce no serious injury. It is also demonstrated that beyond the critical temperature of the brick (480° F.) the heating rate can be materially increased, for example, to a point not greater than 230° F. per hour.

The furnace illustrated and the chart of Figure 7 are assumed to be a 75-ton open hearth furnace, and the graph which is representative of an actual reduction to practice of the herein claimed invention, demonstrates that such a 75-ton open hearth furnace can be heated up after it has been rebuilt, from a cold furnace to one in condition for receiving the starting charge in slightly less than 27 hours. This constitutes a marked improvement, since heretofore a similar heating-up, according to the conventional prior practice, frequently required as much as 47 hours or more.

The disclosed improved method will be recognized by those skilled in the art as a decided advance, since it provides a method of control of the heating-up practice of the brickwork of a furnace which is scientific, feasible, and results in a great saving of time for the initial heating and at the same time will insure against injury of the refractory brick by spalling.

While in the detailed disclosure of the invention, specific reference has been made to the practice of initially heating an open hearth steel furnace having a portion made of silica brick, and while the disclosure recites conditions which have been determined to be highly advantageous and proven by an actual reduction to practice, it is to be understood that the principles of the invention may be applied to other types of brick and to various types of furnaces. Hence the specific data recited and charted is to be interpreted in an illustrative rather than a limiting sense, since various modifications and adaptations may be made by those skilled in the art within the spirit and scope of the appended claims.

We claim:

1. The method of initially heating the brickwork structure of a furnace so as to prevent damage thereto by spalling, which comprises (a) determining the maximum rate of temperature rise per unit of time which the furnace brick will withstand without spalling when heated from normal seasonal atmospheric temperature to the critical temperature of said brick, (b) determining the maximum rate of temperature rise per unit of time which said brick will withstand without spalling after it has reached the critical temperature, then initially heating up the furnace at a relatively slow rate not greater than that of said (a) determination, and thereafter greatly increasing the heating rate but not exceeding that of said maximum (b) determination.

2. The method of initially heating the brickwork structure of a furnace so as to prevent damage thereto by spalling, which comprises ascertaining the critical temperature of the specific type of brick of which the most vulnerable part of the furnace is constructed, initially heating up the furnace at a predetermined relatively slow rate per unit of time until the brickwork attains said critical temperature, and thereafter greatly increasing the heating rate per unit of time to a value not exceeding a predetermined maximum known to be tolerable by said brick.

3. The method of initially heating the refractory brickwork of an open hearth metallurgical furnace from a cold start so as to prevent damage thereto by spalling, which comprises ascertaining the critical temperature of the particular refractory brick of which the most vulnerable part of the furnace is constructed, first gradually increasing the temperature at a predetermined safe rate per unit of time until said critical temperature is reached, and thereafter greatly increasing the heating rate per unit of time not to exceed a predetermined rate known to be tolerable without spalling after said brick has been preheated to said critical temperature.

4. The method of initially heating the brickwork of an open hearth steel making furnace having a portion constructed of silica brick so as to prevent damage thereto by spalling, which comprises ascertaining the critical temperature of said silica brick, first gradually increasing the temperature at a predetermined safe rate per unit of time until said critical temperature is reached, and thereafter greatly increasing the heating rate per unit of time not to exceed a predetermined rate known to be tolerable without spalling after said brick has been preheated to said critical temperature.

5. The method of initially heating the refractory brickwork of an open hearth metallurgical furnace from a cold start so as to prevent damage thereto by spalling, which comprises ascertaining the critical temperature of the particular refractory brick of which the most vulnerable part of the furnace is constructed, embedding a thermocouple in the brickwork and connecting it with a pyrometer to indicate the temperature of said brickwork, first gradually increasing the heat input to the furnace at a rate effective to increase the temperature rise of said brickwork at a predetermined relatively low rate until said critical temperature is attained, and thereafter materially increasing the heat input to the furnace in such controlled manner that the temperature rise of the brickwork per unit of time does not exceed a predetermined rate which the brick is known to be able to withstand without spalling after being heated above said critical temperature.

6. The method of heating up an open hearth steel making furnace having a portion constructed of silica brick whose cristobalite reversion point is approximately 480° F., which comprises raising the temperature of the brick at a rate of approximately 90° F. per hour until the temperature of said brick reaches 480° F., and thereafter rapidly increasing the heating rate to a rate not exceeding approximately 230° F. per hour, whereby the total time required to bring a new or rebuilt furnace to steel making temperature is greatly decreased over prior conventional practice, without causing spalling of the brickwork or otherwise detrimentally affecting the brickwork structure of the furnace.

7. The method of initially heating up a new or rebuilt open hearth steel making furnace having a portion thereof constructed of silica brick whose critical temperature has been ascertained to be approximately 480° F., which comprises so controlling the fuel input for an initial five- or six-hour preheating interval that the rate of temperature rise is not more than 90° F. per hour, and after said preheating interval sharply increasing the fuel input to the furnace so as to rapidly raise the temperature rate to approximately 230° F. per hour, whereby a new or rebuilt furnace is thus rapidly yet safely brought to steel making temperature under optimum conditions.

8. The method of initially heating up a brick furnace from a cold starting condition, comprising embedding at least one thermocouple in a brick forming part of the furnace structure and connecting said thermocouple with a pyrometer, conveying a combustible fuel to the furnace and burning it therein, determining the time-temperature gradient of the furnace brick by observation of pyrometer readings as the furnace is being heated up, and varying the amount of fuel supplied to the furnace so as to not exceed a predetermined time-temperature gradient which the brick of the furnace structure is known to be able to withstand without damage.

9. In the operation of an open hearth steel making furnace constructed of brick, the method of heating up the furnace from a cold starting condition, comprising installing thermocouples in the brickwork of the furnace and connecting them with respective pyrometers, conveying a combustible fuel to the furnace and burning it therein, determining the time-temperature gradient of the brickwork in different parts of the furnace by observation of pyrometers connected with the respective thermocouples as the furnace structure is being heated up, and varying the amount of fuel supplied to the furnace in accordance with a predetermined time-temperature gradient which the furnace brickwork is known to be capable of withstanding without spalling.

LOREN J. WESTHAVER.
JOHN A. SLENKER.

REFERENCES CITED

The following references are of record in the file of this patent:

UNITED STATES PATENTS

| Number | Name | Date |
|---|---|---|
| 1,810,776 | McDermott | June 16, 1931 |
| 2,184,975 | MacConville | Dec. 26, 1939 |
| 2,201,946 | Krogh | May 21, 1940 |